United States Patent [19]
Guthrie et al.

[11] Patent Number: 5,673,399
[45] Date of Patent: Sep. 30, 1997

[54] SYSTEM AND METHOD FOR ENHANCEMENT OF SYSTEM BUS TO MEZZANINE BUS TRANSACTIONS

[75] Inventors: Guy Lynn Guthrie, Austin; Danny Marvin Neal, Round Rock; Edward John Silha; Steven Mark Thurber, both of Austin, all of Tex.

[73] Assignee: International Business Machines, Corporation, Armonk, N.Y.

[21] Appl. No.: 552,034

[22] Filed: Nov. 2, 1995

[51] Int. Cl.[6] ................................................. G06F 13/00
[52] U.S. Cl. .................... 395/308; 395/306; 364/240.2
[58] Field of Search .................. 395/200.02, 200.13, 395/250, 825–827, 849, 853, 856–859, 872, 874, 280, 288, 292, 306–309, 800; 370/85.13

[56] References Cited

U.S. PATENT DOCUMENTS

| | | | |
|---|---|---|---|
| 5,379,386 | 1/1995 | Swarts | 395/309 |
| 5,455,915 | 10/1995 | Coke | 395/293 |
| 5,542,055 | 7/1996 | Amini et al. | 395/281 |
| 5,546,546 | 8/1996 | Bell et al. | 395/292 |

*Primary Examiner*—Lance Leonard Barry, Esq.
*Attorney, Agent, or Firm*—Mark E. McBurney

[57] ABSTRACT

A data processing system includes a host processor, a number of peripheral devices, and one or more bridges which may connect between the host, peripheral devices and other hosts or peripheral devices such as in a network. Each bridge, such as a PCI host bridge, connects between a primary bus (e.g. system bus) and a secondary bus wherein for the purpose of clarity, the primary bus will be considered as the source for outbound transactions and the destination for inbound transactions and the secondary bus would be considered the destination for outbound transactions and the source for inbound transactions. The host bridge includes an outbound data path, an inbound data path, and a control mechanism. The outbound data path includes a queued buffer for storing transactions in order of receipt from the primary bus where the requests in the queued buffer may be mixed as between read requests and write transactions, the outbound path also includes a number of parallel buffers for storing read reply data and address information. The inbound path is a mirror image of the outbound path with read requests and write requests being stored in a sequential buffer and read replies being stored in a number of parallel buffers. Both the inbound path and the outbound path in the host bridge are controlled by a state machine which takes into consideration activity in both directions and permits or inhibits bypass transactions based on the protocol of the buses being interconnected through the bridge.

14 Claims, 3 Drawing Sheets

Definitions:

INBOUND = Towards the host Processor/s
OUTBOUND = Away from the host Processor/s
PMW = Posted Memory Write
RRQ = Read Request
IOWR = I/O Write
RRP = Read Reply
DMA DATA = DMA Write Data
DMA Read = DMA Read Request

SYSTEM AND METHOD FOR ENHANCEMENT OF SYSTEM BUS TO MEZZANINE BUS TRANSACTIONS

CROSS REFERENCE TO RELATED APPLICATIONS

U.S. patent application entitled "DATA PROCESSING SYSTEM INCLUDING BUFFERING MECHANISM FOR INBOUND AND OUTBOUND READS AND POSTED WRITES", filed Jun. 7, 1995, Ser. No. 08/472,603, and assigned to the assignee of the present invention.

U.S. patent application entitled "METHOD AND APPARATUS FOR CONFIGURING PCI BRIDGES ON MULTIPLE PCI BUSES ENVIRONMENT", filed May 28, 1993, Ser. No. 08/070,134, now U.S. Pat. No. 5,542,055 and assigned to the assignee of the present invention.

BACKGROUND OF THE INVENTION

1. Field of the Invention

The present invention relates to data processing systems, and more particularly to data processing systems including mechanisms for efficiently handling inbound and outbound reads and posted writes from host to peripheral devices.

2. Description of Related Art

Many standard bus architectures for use in data processing systems such as the Peripheral Component Interconnect (PCI) bus specification contain ordering rules for transactions that traverse a bus to bus bridge, which connects at least two buses having the same bus protocol. Examples of such transactions are read requests outbound from a host processor to a peripheral device, read replies (responsive to the read requests) containing the data from the peripheral device inbound to the host processor or posted writes in which a write command is posted to a buffer in a bus to bus bridge allowing the host to proceed with other processing. A posted write herein means that the write has completed on the initiating bus and is posted in the host bridge for future completion on the destination bus. Current bus to bus bridge architectures either require write buffers in both outbound (away from the host processor) and inbound (towards the host processor) direction to be flushed out prior to completing a read transaction that traverses the bus to bus bridge, or define specific bus-to-bus ordering rules such as previously noted in the cross referenced patent application and set forth in the PCI Local Bus Specification, version 2.1, for the PCI bus architecture. The requirement to flush the buffers can create a performance problem for a busy server by holding up the processor read accesses which are retried if there are any posted writes in the bridge buffers. Retry herein means that the target device being addressed by the master acknowledges the access but signals that it is busy and it terminates the transaction. The master then tries the access again at a later time.

A bus to bus bridge which connects one PCI bus to another PCI bus is herein referred to as a PCI—PCI bridge. Ordering rules for transactions that traverse a PCI—PCI bridge are included in the PCI local Bus Specification, revision 2.1. A bridge which connects a host processor(s), system bus or other system interconnection to a PCI bus is referred to herein as a PCI Host bridge (PHB), or host bridge.

Host Bridges have unique requirements above that required of PCI—PCI bridges, but also do not have all of the same constraints as a PCI—PCI bridge since for a host bridge, the source of most transactions on the primary (system) side of the host bridge interface are initiated by a host processor(s) rather than an I/O Device.

Several prior art bridge architectures attempt to improve performance and eliminate throughput delays.

An article in the IBM Technical Disclosure Bulletin dated July, 1992, at page 233 and entitled "Architecture for High Performance Transparent Bridges," shows architecture for high performance bridges with multi-port bridges interconnecting networks including buffering components which guarantee transfer of data whether read or write with uniform handling inside the bridge.

Although the article generally relates to improvement in performance of bridges, the article does not address the problem of requiring buffers to be flushed out prior to completing a read transaction which degrades system performance.

U.S. Pat. No. 5,333,269 entitled "Mechanism for Transferring Messages Between Source and Destination Users Through a Shared Memory," teaches a common bus to which a memory with a number of independent buffers, a memory interface and a central control unit are connected. The memory interface receives messages from source users, stores the message in selected buffers, and chains the buffers together. The control apparatus generates inbound message cues and outbound message cues in response to commands which it receives from the memory interface.

Although the patent has some similarities to high performance bus bridge architectures, the patent does not address nor suggest a solution to the problem of a requirement for flushing out buffers prior to completing a read transaction which follows a posted write transaction.

U.S. Pat. No. 5,247,620 entitled "Bridge Apparatus with an Address Check Circuit for Interconnecting Networks," teaches multiple inbound and outbound buffers for reading out information from processor to peripheral devices and for bridging in a network environment.

Although the patent shows in FIG. 1 a bus to bus bridge including a buffer memory, the patent does not teach nor suggest a mechanism for improving performance in bus to bus bridges which eliminates the need for flushing out buffers between write and read transactions.

None of the prior art teaches nor suggests the performance improvement of eliminating the requirement for flushing out buffers for a read operation following a write operation.

Further, the prior art does not adequately deal with the problem of handling multiple mixed inbound and outbound transactions. Additionally, the prior art does not address the unique requirements of a host bridge that must interface between buses having different protocols, such as a system bus and an I/O bus, combining transaction ordering requirements, considering the system coherency domain requirements, I/O bus requirements, deadlock avoidance, and performance considerations.

In particular, a specific problem exists when interconnecting a system bus with an I/O bus since a system bus will typically have the ability to tag certain transactions relative to the device which is requesting/providing the data. However, I/O buses (particularly the PCI bus) do not have the capability to tag transactions relative to devices, but only accesses data based on the address, which can cause problems relative to data coherency. That is, a first device may ask for data from a specific address, the bridge can then retry this first device and tell it to come back later for the data. The bridge then obtains the data from the specific address and stores it in a buffer, or the like, in the bridge waiting for the first device to again ask for the data. Prior to the first device re-requesting the data, a second device may write other data at this specific address and attempt to read it back. Since, the data requested by the first device is now in a buffer in the bridge, it will be provided to the second device, because a typical bus to bus bridge does not have the capability to tag data for specific devices, and only knows that data from the specific address has been requested. Therefore, it can be seen that a problem exists when data from the same address is requested by different devices, since data for the first device will be provided to the second device. Thus, the second device has "stolen" data from the first device which can cause incorrect results. It can be seen that a need exists for a bridge that will prevent devices from obtaining incorrect data which is targeted for another device and still allow processing of out of sequence transactions.

Another problem exists when certain I/O peripheral devices attempt a direct memory access (DMA) to system memory at the same time a store transaction is pending in the output buffer of the bridge. This can cause a deadlock condition where the store is waiting for the DMA operation to complete and the DMA transaction is waiting from the store to finish. More particularly, many types of I/O buses and their corresponding peripheral devices do not have "retry" capability. Thus, when a peripheral device accesses the bus, it maintains control of the bus until its transaction is completed. For example, a peripheral device may request data from a system memory connected to the system bus. In this case, a read request is placed in the transaction queue of the bridge. Subsequently, a read reply operation which contains the requested data from memory will be provided to the bridge. However, in the meantime, a processor connected to the system bus may implement a store operation to place data in the peripheral device that had previously requested the DMA data from system memory. If this store operation precedes the DMA data reply transaction in the bridge queue, a deadlock condition will occur. That is, the store transaction, which is targeting the requesting peripheral device, cannot complete because the peripheral device cannot proceed with any other operations until it receives the DMA data, and the store transaction, precedes the DMA data reply transaction in the bridge queue. Thus, it can be seen that a need exists for a bridge that can eliminate this deadlock condition and allow enhanced data transfer operations in a data processing system.

SUMMARY OF THE INVENTION

Therefore, it is an object of the present invention to efficiently handle multiple mixed transactions in both inbound and outbound directions in a host bridge, having a control mechanism for controlling the transmission of read requests, read replies, I/O writes and posted memory writes in an efficient manner, providing proper host bridge transaction ordering and avoiding deadlocks while maintaining a high performance level of the system.

Accordingly, a data processing system includes a host processor(s), a number of peripheral devices, and one or more bridges which may connect between one or more host processors, peripheral devices and other host processors with interconnected peripheral devices such as in a network. A host bridge connects between a primary bus (e.g. a system bus) and a secondary bus (e.g. an I/O bus, such as a PCI bus) wherein for the purpose of clarity, the primary bus will be considered as the source for outbound transactions and the destination for inbound transactions and the secondary bus will be considered the destination for outbound transactions and the source for inbound transactions. Different transactions on the primary bus may or may not occur simultaneous to other transactions on the secondary bus, depending on implementation. Each host bridge includes an outbound data path, an inbound data path, and a control mechanism. The outbound data path includes a queued buffer for storing transactions in order of receipt (or other ordering) from the primary bus where the requests in the queued buffer may be mixed as between read requests and write transactions, the outbound path also includes a number of other buffers for storing read reply data and address information.

The inbound path is a mirror image of the outbound path with read requests and write requests being stored in a transaction buffer and read replies being stored in a number of other buffers. Both the inbound path and the outbound path in the host bridge are controlled by a state machine which takes into consideration activity in both directions and permits or inhibits bypass transactions. Bypass herein means that a subsequent transaction may be allowed to be processed before a prior transaction, even though the prior transaction entered the queue earlier than the subsequent transaction.

It is a feature of the present invention that inbound and outbound transaction requests may be handled in both sequential and non-sequential order under the control of a predetermined state machine based on a specific type of transaction and a defined set of ordering rules.

It is another feature of the present invention that inbound and outbound transactions in a host bridge can be efficiently handled by a mechanism which allows read transactions to follow write transactions without requiring buffers to be flushed out.

It is another feature of the present invention that proper data consistency be maintained relative to the different transactions as they traverse a host bridge.

Other transactions such as read requests must be completed (data fetched) on the destination bus prior to completing on the initiating bus. For example, a host processor may request data from a peripheral device on the I/O bus. The data must be fetched from the peripheral device on the destination bus and provided through the host bridge to the host processor on the initiating bus, before the transaction is considered complete. With the features of the present invention, processing of transactions such as a read access can progress without flushing posted writes.

A posted read herein means that the target device acknowledges the access and signals that it is busy and then terminates the access with a retry control signal. The master (requesting device) will try the access again later. The host bridge of the present invention then posts the read request for subsequent processing such that it may have the read data available when the master tries the access again later. If the master tries again before the host bridge obtains the requested data, the bridge again signals retry but does not buffer a second copy of the access request. For a host bridge, the read request from a processor(s) may be tagged and not require the processor to be retried.

It is another feature of the present invention that, in general, the load operation (a read operation relative to a host processor) path and store (a write operation relative to a host processor) path should be independent of the direct memory access (DMA) path between peripheral devices and system memory for improved performance and ease of implementation. It should be noted that load and store operations will consider a flow of transactions wherein a load will cause data to be loaded into a host processor and a store will cause data to be stored in a peripheral device from a host processor.

Yet another feature of the present invention is that a load request to either the peripheral memory space or the peripheral I/O space (I/O output buffer) of a host bridge must never be passed to the I/O bus before a previous load to either the peripheral memory space (memory output buffer) or the peripheral I/O space of the same host bridge when both of the loads go to the same address. This allows improved performance (allows passing) when the addresses are different, but avoids the problem of one processor stealing another processors data (i.e. getting stale data) when one or both processors write to that same address.

It is another feature of the present invention that DMA read reply data be allowed to bypass previous load and store transactions buffered in the host bridge to avoid deadlocks. This is a different requirement than for bus to bus bridges, and is required for proper interaction between a host bridge and the PCI bus in order to improve performance.

Yet another feature of the present invention is that a load or store to either the peripheral memory space or the peripheral I/O space of a host bridge must never be passed to the I/O bus before a previous store to either the peripheral memory space or the peripheral I/O space of the same host bridge (i.e. multiple stores to the I/O bus generated by one host bridge must be kept in order and a load must not pass a store.

These techniques can be applied to host bridges, and in general to bus to bus bridges that also post write and read transactions.

The foregoing has broadly outlined the features and technical advantages of the present invention in order that the detailed description of the invention which follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference will be made to the following description taken in conjunction with the accompanying drawing, in which.

DETAILED DESCRIPTION OF THE PREFERRED EMBODIMENTS

Figure 1:
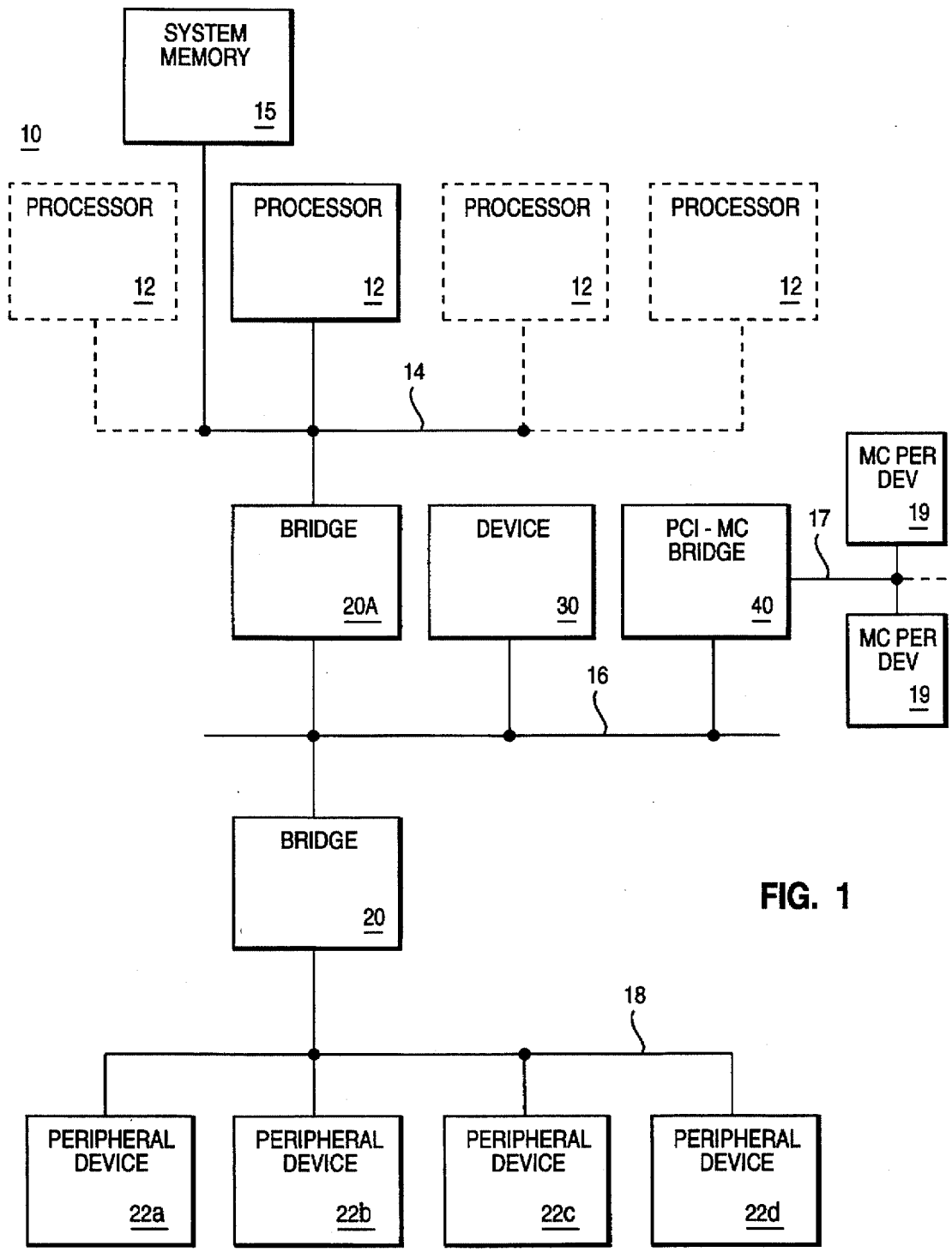
FIG. 1 is a block diagram of a data processing system embodying the present invention.

Referring now to FIG. 1, a data processing system embodying the present invention will be described.

System 10 includes at least one host processor 12 connected to a first bus 14, such as a system bus capable of being used by a multiprocessor system (e.g. the 6XX bus which is available from IBM Corp.). Other processors 12 shown in dotted lines on FIG. 1 may also be connected to bus 14.

Also connected to system bus 14 is host bridge 20a which connects between first bus 14 and a second bus 16. System memory 15 is also connected to system bus 14. Other devices 30, 40 may be connected to bus 16 as well. By way of example and not limitation, device 40 may be another bridge chip for connecting a PCI bus (e.g. bus 16) with another I/O bus 17, such as the Microchannel bus (Microchannel is a trademark of IBM Corp.) available from IBM. Microchannel (MC) peripheral devices 19 are also shown connected to MC bus 17. Thus, MC devices are capable of communicating with components on the host system, such as memory 15, processors 12, and the like through PCI-MC bridge 40 and host bridge 20a. Although MC is used herein as an example, it should be noted that the scope of the present invention contemplates other types of bridge chips 40 and peripheral devices 19 for use with I/O buses, such as ISA, ESA, VME, or the like. Additionally, another bridge 20 is connected to bus 16 and to a third bus 18. Also connected to bus 18 may be a number of stations or peripheral devices 22a, 22b, 22c and 22d. In a preferred embodiment bridge 20 is a bus to bus bridge which connects buses having identical protocols, i.e. buses 16 and 18 are both PCI buses. Other than bridges 20 and 20a, each of the elements referenced above with respect to FIG. 1 are all well known in the art and need not be described in greater detail herein.

As an example, but in no way limiting the scope of the invention, buses 16 and 18 each may be a PCI bus which has become an industry standard.

Figure 2:
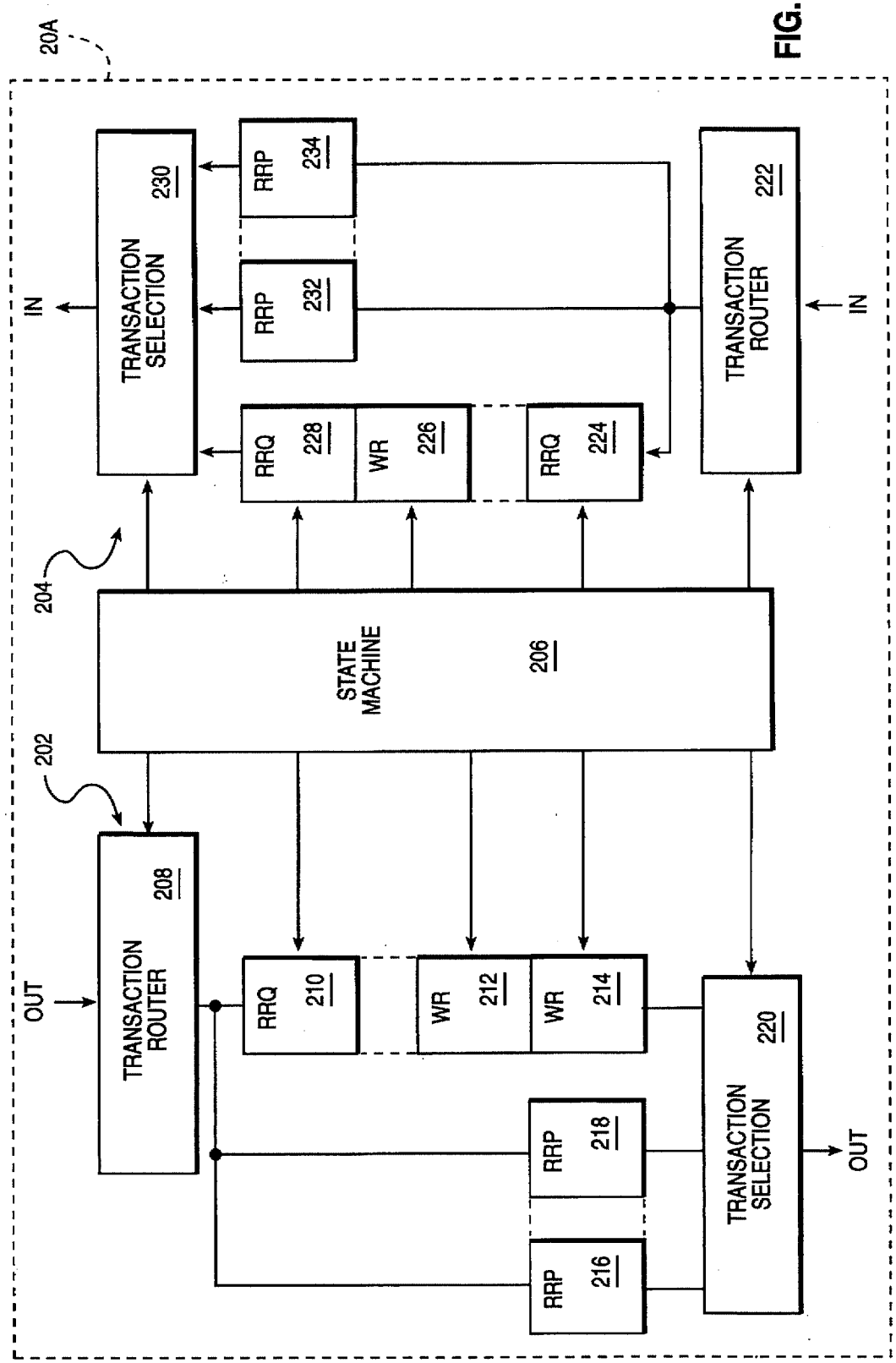
FIG. 2 is a block diagram of a host bridge (such as a PCI host bridge) illustrating features of this invention in accordance with the system of FIG. 1.

Referring now to FIG. 2, host bridge 20a will be described in greater detail. As used in this description of the preferred embodiment of the invention, the term outbound refers to those transactions which are away from the processor 12 and inbound refers to those transactions which are toward the processor 12.

Bridge 20a has two data paths, outbound path 202 and inbound path 204. All transactions inbound and outbound are controlled by state machine 206.

When an outbound transaction is received by transaction router 208, the transaction format is examined to determine whether the transaction is a read request (request for data), a read reply (a response to a read request that provides data), or a write request (a request to place data in a specific device).

A read request has a format of an address and control information. A read reply has a format which includes an address, control information and the data which had been requested and which is now being sent to the original requestor.

A write transaction, such as a posted memory write (PMW) or I/O write (I/O WR) includes an address, control information and the data which will be written into the selected address.

Assuming, for example, that the transaction currently active in transaction router 208 is a read request, the transaction will be forwarded to one of a number of sequential buffers 210, 212, 214. The sequential buffer entries 210, 212, 214 may be any appropriate number of buffer entries in length adequate to handle the stack of transactions anticipated to be pending in bridge 20a. Also, if the transaction is a write transaction, such as an I/O write or posted memory write, the transaction will be forwarded to one of the sequential buffers 210, 212, 214.

If the transaction pending in transaction router 208 is a read reply (RRP), the read reply transaction is transmitted to one of parallel buffer entries 216, 218.

At any time, the transaction to be selected and passed to a secondary bus by transaction selection circuit 220 is controlled by state machine 206. This allows, for example, out of sequence accesses to transactions stored in sequential buffers 210, 212 or 214 or to a read reply transaction in parallel buffers 216, 218.

The inbound path 204 includes the same elements as outbound path 202 except the elements are connected in the reverse order. That is, transaction router 222 is connected to the secondary bus 16 (see FIG. 1). As explained above with reference to outbound transaction router 208, inbound transaction router 222 is controlled by state machine 206. Each transaction is routed to one of the sequential inbound buffers 224, 226, and 228 for read request (RRQ) and write transactions (I/O write and PMW). Read reply transactions are transmitted to parallel buffers 232, 234. Inbound selection circuit 230 under the control of state machine 206 controls transmission of transactions from either sequential buffers 224, 226 or 228 or from parallel buffers 232 or 234 respectively.

Figure 3A:
FIGS. 3a and 3b are logic tables showing control of transactions in the host bridge of FIG. 2 for each type of transaction on both the outbound and the inbound path.
Figure 3B:

State machine 206 operates under a protocol which is defined by the state machine logic table shown in FIGS. 3a and 3b to control multiple transactions flowing either outbound or inbound or both.

Referring now to FIGS. 3a and 3b, the logic table which controls state machine 206 will be described. Across the top of logic table 3a are transactions which represent outbound transactions, and which will be referred to for convenience as a first transaction. Along the left side of logic table 3a are the outbound transactions which will be referred to for convenience as second transactions. Similarly, across the top of logic table 3b are transactions which represent inbound transactions, and will be referred to for convenience as a first transaction. Along the left side of logic table 3b are the inbound transactions which will be referred to for convenience as second transactions.

Note that for the entries in the tables of FIGS. 3a and 3b, a "0" entry means that a subsequent (second) transaction must not be allowed to bypass an earlier (first) transaction. A "1" entry means that a subsequent transaction must be allowed to enter the bridge, if necessary to bypass an earlier transaction for the transaction to progress, otherwise a deadlock can occur. A "0/1" entry means that a subsequent transaction may be allowed to bypass an earlier transaction, but is not required to do so (no ordering requirements—a don't care, and can be implementation specific based on performance and implementation cost considerations). That is, a "0/1" may allow bypassing in some cases, but not others, depending on the particular situation or implementation.

DMA read reply data must be allowed to bypass previous load and store transactions buffered in the host bridge to avoid deadlocks. This is a different requirement than for bus to bus (e.g. PCI—PCI) bridges, and is required for proper interaction between a host bridge and the PCI bus. This also can improve performance.

If, for example, there is an outbound first transaction which is a read request (RRQ), and an outbound second transaction which is a read reply (RRP), the intersection of the column and row in the logic table of FIG. 3a shows a one (1). A one in any position in the logic table indicates a subsequent transaction must be allowed to bypass this previous transaction. Thus, the read reply (RRP) with DMA data must be allowed to bypass the read request. Also, it can be seen that a RRP must be allowed to bypass a write operation, such as a PMW or I/O write. By allowing DMA data (RRP) operations to bypass processor load and store operations, the previously discussed problem which may cause a deadlock condition is eliminated. Assume for the purposes of example, that MC device 19 is requesting data from system memory 15 by a DMA request. Thus, a RRQ transaction is placed in one of sequential buffers 224, 226, 228 (since this is an inbound operation). In this case, the RRQ is assumed to be in buffer 228. Prior to the DMA data being returned from system memory 15, processor 12 initiates a write operation to MC device 19. Thus, for example, an I/O write transaction is placed in one of sequential buffers 210, 212, 214 (since this is an outbound transaction). In this case, assume the I/O write is placed in buffer 214. Subsequently, system memory 15 places the RRP, responsive to the RRQ from MC device 19 (including the requested DMA data) in one of parallel buffers 216 or 218, e.g. buffer 216. As noted earlier, the protocol of some I/O devices, such as MC device 19 require them to maintain control of bus 17 until each transaction is completed. Thus, a potential deadlock condition exists, since the I/O write operation in buffer 214 cannot complete, because MC device 19 is waiting on the DMA data in parallel buffer 216. The present invention prevents this deadlock condition from occurring by allowing the RRP transaction (including DMA data) in buffer 216 to bypass the I/O write transaction in buffer 214 and complete the DMA request by MC device 19. Of course, the present invention will also prevent other deadlock conditions from occurring, such as when a PMW or RRQ transaction may be in sequential buffer 214 in conflict with a RRP in buffer 216.

A zero in any position of the logic tables of FIGS. 3a and 3b indicate a prohibited bypass transaction. Thus, an outbound write operation as a first transaction, followed by an outbound read request as a second transaction, is not permitted to be bypassed by the second transaction. As used herein the term "bypass" means to complete on the destination bus a second request prior to completion of a first request. However, if the first transaction is, for example, an outbound write transaction, bypass of an outbound read reply transaction must be allowed.

It should be noted that all positions in logic tables 3a and 3b where there is a zero (0) indicating a prohibited bypass transaction involve write transactions. For example, an outbound read request as a second transaction cannot bypass an outbound write as a first transaction. From FIG. 3b, it can be seen that for inbound transactions, the same principles apply. Thus, an inbound read request (RRQ), read reply (RRP) or write transaction (PMW) may not bypass an earlier inbound write (PMW) as the first transaction, as shown in FIG. 3b. The logic tables 3a and 3b which control the operation of state machine 206 controls the gating of transactions in transaction routers 208 and 222 and transaction selection circuits 220 and 230, respectively. Those skilled in the art will understand how the logic represented in tables 3a and 3b can be implemented in control logic circuitry and included within state machine 206.

In the case of the preferred embodiment where a PCI Host Bridge (PHB) connects a PCI bus, as an I/O bus, with a system bus in a computer system using a microprocessor having unique characteristics, such as the PowerPC 604 microprocessor (PowerPC and PowerPC 604 are trademarks of IBM Corp.) available from IBM Corp., there are several considerations which must be addressed. In general, the load (RRQ) and store(PMW, I/O WR) paths relative to the processor 12 should be independent of the DMA path (e.g. RRP) relative to peripheral device for improved performance and ease of implementation. Also, for the "0/1" entries in the tables of FIGS. 3a and 3b, these transactions may bypass but are not required to bypass. Whether to bypass or not may be based on any fairness rule, performance consideration, or ease of implementation (except for the case which will be described in the following paragraph).

For a PCI host bridge, a load (such as a RRQ transaction) to either the peripheral memory space or the peripheral I/O space of the host bridge must never be passed to the I/O bus before a previous load to either the peripheral memory space or the peripheral I/O space of the same host bridge when both of those loads go to the exact same address. From FIG. 3a, it can be seen that a "0/1" is present at the intersection of the RRQ (load) operation as a first transaction and a RRQ (load) operation as a second transaction. In this case, bypassing is allowed, i.e. for the case where the targeted addresses are not the same. However, if a comparator contained in state machine 206 determines that the addresses are the same, then the second RRQ transaction cannot bypass the first RRQ transaction. Thus, a "0/1" (in this case) indicates that bypassing of the first transaction by the second transaction may occur, depending on additional factors, e.g. dependent on the outcome of the address comparison. This allows improved performance (allows passing) when the addresses are different, but avoids the problem of one device stealing another device's data (getting stale data) when one or both devices are accessing data at the same address. If these transactions have different addresses, they may bypass. This allows for improved performance when the addresses are different, but avoids the problem of one device stealing another devices's read data (getting stale data) when one or both devices's write to the same address, because, the devices are accessing data at different addresses and there is no conflict.

Those skilled in the art will also understand how state machine 206 may include a comparator to determine if the addresses targeted by the requesting devices (e.g. processors 12) are identical. Other considerations include the case where a load or store to either the peripheral memory space or the peripheral I/O space of a PHB must never be passed to the I/O bus before a previous store to either the peripheral memory space or the peripheral I/O space of that same PHB (that is, multiple stores to the I/O bus generated by one PHB must be kept in order and a load must not pass a store. For example, it can be seen from FIG. 3a that a load (RRQ) as the second transaction cannot pass a store (PMW or I/O WR), since a "0" is present at the intersection of these transactions. Further, a store as a second transaction (e.g. PMW) cannot pass another store as a first transaction (PMW or I/O WR) as seen from the "0" at the intersection of these transaction in FIG. 3a.

Note that all subsequent inbound transactions must not be allowed to bypass earlier inbound posted memory writes (PMW). FIG. 3b, shows a "0" in the intersection between all the second transactions (except I/O WR because it is not applicable) and a PMW as the first transaction. Also, subsequent inbound posted memory writes (PMW) as a second transaction must be allowed to bypass earlier read requests (RRQ) and read replies (RRP) as first transactions, as shown by the "1" in the intersection of these transactions in FIG. 3b.

Note also that there are no tables which address outbound vs inbound transactions, and inbound vs outbound transactions. In these cases, since the transactions are travelling in opposite directions and are going to different address spaces, these transactions should be independent and have no ordering requirements relative to each other. For cases where any outbound versus any inbound transaction or any inbound versus any outbound transaction requires ordering, it is handled by software protocols beyond the scope of this invention.

It should be noted that some table entries in FIG. 3b are "na". These cases are "not applicable" since an inbound I/O WR transaction is not defined in a the preferred embodiment which address the case of a system which utilizes a PowerPC microprocessor.

Other than the considerations listed above and considerations listed in IBM U.S. patent application Ser. No. 08/473,603, hereby incorporated by reference, the transaction ordering requirements for a PCI Host Bridge in a system using a microprocessor, such as a PowerPC microprocessor, are the same as for PCI—PCI bridges (see the PCI Local Bus Specification, version 2.1).

A master that attempts a read access and is retried, must periodically try the access again until it completes.

Although the present invention and its advantages have been described in detail, it should be understood that various changes, substitutions and alterations can be made herein without departing from the spirit or scope of the invention as defined in the appended claims.

We claim:

1. A data processing system, comprising:

a system bus connecting at least one processor with a memory;

an I/O bus, having a protocol different from said system bus;

at least one peripheral device, connected to said I/O bus, that shares data with said memory and said at least one processor; and a bridge, for interconnecting said I/O bus to said system bus and controlling a sequence of transactions to prevent a deadlock condition by causing a first data transfer between said at least one peripheral device and said memory to be completed before a second data transfer between said at least one processor and said at least one peripheral device is completed;

wherein said at least one peripheral device suspends processing activity until said first data transfer is completed; and wherein said bridge includes a first buffer for storing a request from said at least one peripheral device to said memory corresponding to said first data transfer; a second buffer for storing a request from said at least one processor to said at least one peripheral device corresponding to said second data transfer; a third buffer, parallel to said second buffer, for storing a reply from said memory including data corresponding to said first data transfer; and means for causing said reply from said memory to bypass said request from said at least one processor, such that said at least one peripheral device can continue processing activity.

2. A system according to claim 1 wherein said first data transfer is a direct memory access of said memory by said at least one peripheral device.

3. A system according to claim 2 wherein said second data transfer is a load or store operation by said at least one processor.

4. A system according to claim 1, wherein said bridge comprises a first data path for transmitting transactions from said I/O bus to said system bus.

5. A system according to claim 4 wherein said first data path comprises:

a first transaction router circuit connected to an input to said bridge for gating transactions to buffers in said first data path;

at least one parallel buffer connected to said first transaction router circuit for storing read reply transactions;

at least one sequential buffer connected to said first transaction router circuit for storing read request transactions and write transactions;

a first transaction selection circuit connected to outputs of said parallel and sequential buffers for selecting one or more transactions to be output from said first data path under control of a state machine.

6. A system according to claim 5, wherein said bridge further comprises a second data path for transmitting transactions from said system bus to said I/O bus.

7. A system according to claim 6 wherein said second data path comprises:

a second transaction router circuit connected to an input to said bridge for gating transactions to buffers in said first data path;

at least one parallel buffer connected to said second transaction router circuit for storing read reply transactions;

at least one sequential buffer connected to said second transaction router circuit for storing read request transactions and write transactions;

a second transaction selection circuit connected to outputs of said parallel and sequential buffers for selecting one or more transactions to be output from said second data path under control of said state machine.

8. A data processing system according to claim 7, wherein said state machine controls gating of transactions in said first and second data path in accordance with a predetermined logic structure.

9. A method of processing data in a data processing system, comprising the steps of:

connecting at least one processor and a memory with a system bus;

providing an I/O bus, having a protocol different from said system bus;

connecting a plurality of peripheral devices, that share data with said memory and said at least one process, with said I/O bus;

interconnecting said I/O bus to said system bus and controlling a sequence of transactions to prevent a deadlock condition by causing a first data transfer between one of said plurality of peripheral devices and said memory to be completed before a second data transfer between said at least one processor and said one of said plurality of peripheral devices is completed maintaining said one of said plurality of peripheral devices in a state where data processing activity is suspended until said first data transfer is completed wherein said step of interconnecting includes the steps of storing in a first buffer, a request from said at least one peripheral device to said memory corresponding to said first data transfer; storing in a second buffer, a request from said at least one processor to said at least one peripheral device corresponding to said second data transfer; storing in a third buffer, parallel to said second buffer, a reply from said memory including data corresponding to said first data transfer; and causing said reply from said memory to bypass said request from said at least one processor such that said at least one peripheral device can continue processing activity.

10. A method according to claim 9 wherein said first data transfer is a direct memory access of said memory by said one of said plurality of peripheral devices, and said second data transfer is a load or store operation by said at least one processor.

11. A data processing system including a processor connected to a memory by a system bus and at least one peripheral device connected to an I/O bus, comprising:

a bridge for interconnecting said I/O bus to said system bus;

means, within said bridge, for storing a first data transfer request from said peripheral device to said memory, and a second data transfer request from said processor to said peripheral device;

wherein said bridge prevents a deadlock condition from occurring by causing a reply, from said memory to said peripheral device corresponding to said first data transfer request, to bypass said second data transfer request.

12. A system according to claim 11 wherein said means for storing comprises:

a first buffer for storing said first data transfer request;

a second buffer for storing said second data transfer request; and a third buffer, parallel to said second buffer, for storing said reply.

13. A system according to claim 12 wherein said bridge further comprises means for comparing an address of said second data transfer request and said reply to determine when said bypass is to occur.

14. A system according to claim 13 wherein said means for comparing comprises a table representing conditions when a deadlock condition may occur and said reply is to bypass said second data transfer request in order to prevent said deadlock condition from occurring.

* * * * *